United States Patent
Benisty et al.

(10) Patent No.: US 11,741,025 B2
(45) Date of Patent: Aug. 29, 2023

(54) STORAGE SYSTEM AND METHOD FOR PROVIDING A DUAL-PRIORITY CREDIT SYSTEM

(71) Applicant: Western Digital Technologies, Inc., San Jose, CA (US)

(72) Inventors: Shay Benisty, Beer Sheva (IL); Ariel Navon, Revava (IL); Judah Gamliel Hahn, Ofra (IL); Alon Marcu, Tel Mond (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/178,401

(22) Filed: Feb. 18, 2021

(65) Prior Publication Data

US 2022/0171716 A1 Jun. 2, 2022

Related U.S. Application Data

(60) Provisional application No. 63/119,783, filed on Dec. 1, 2020.

(51) Int. Cl.
*G06F 13/16* (2006.01)
*G06F 9/54* (2006.01)

(52) U.S. Cl.
CPC .......... *G06F 13/1605* (2013.01); *G06F 9/546* (2013.01)

(58) Field of Classification Search
CPC ..... G06F 13/1605; G06F 9/546; H04L 47/10; H04L 47/30; H04L 47/39; H04L 49/90
USPC .................................................. 710/29, 34
See application file for complete search history.

(56) References Cited

U.S. PATENT DOCUMENTS

| | | | |
|---|---|---|---|
| 7,362,705 B2 * | 4/2008 | Beukema | G06F 13/4208 370/468 |
| 7,698,477 B2 | 4/2010 | Breti et al. | |
| 8,151,145 B2 | 4/2012 | Feehrer | |
| 8,197,547 B2 * | 6/2012 | Higham | A61L 27/50 623/17.16 |
| 8,867,559 B2 * | 10/2014 | Dai | H04L 47/6275 370/414 |
| 9,864,716 B2 * | 1/2018 | Hathorn | G06F 13/4027 |
| 9,921,994 B1 * | 3/2018 | Zhu | G06F 13/4265 |
| 10,249,017 B2 * | 4/2019 | Kacevas | G09G 5/363 |
| 10,469,395 B2 * | 11/2019 | Seely | H04L 49/9005 |
| 10,509,591 B2 * | 12/2019 | Tidwell | G06F 3/0688 |
| 10,838,884 B1 * | 11/2020 | Magudilu Vijavaraj | G06F 13/1668 |
| 11,055,243 B1 * | 7/2021 | Pan | G06F 13/4031 |
| 11,079,822 B2 * | 8/2021 | Hatch | G06F 3/0653 |
| 2008/0126606 A1 * | 5/2008 | Wang | G06F 13/28 710/29 |
| 2010/0296520 A1 * | 11/2010 | Matthews | G06F 9/5016 370/468 |
| 2011/0142067 A1 * | 6/2011 | Jehl | H04L 47/39 370/462 |

(Continued)

*Primary Examiner* — Brian T Misiura
(74) *Attorney, Agent, or Firm* — Crowell & Moring LLP

(57) ABSTRACT

A storage system and method for providing a dual-priority credit system are disclosed. In one embodiment, a storage system is provided comprising a memory and a controller. The controller is configured to receive, from a host, a plurality of credits for sending messages to the host; allocate a first portion of the plurality of credits for non-urgent messages; and allocate a second portion of the plurality of credits for urgent messages. Other embodiments are provided.

17 Claims, 8 Drawing Sheets

(56) References Cited

U.S. PATENT DOCUMENTS

| | | |
|---|---|---|
| 2014/0089533 A1 | 3/2014 | Saripalli |
| 2014/0245300 A1* | 8/2014 | Clegg ................. G06F 9/45558 718/1 |
| 2015/0081941 A1* | 3/2015 | Brown .................... G06F 13/14 710/116 |
| 2016/0203022 A1* | 7/2016 | Challa ................... G06F 9/5011 718/104 |
| 2017/0068626 A1 | 3/2017 | Lais et al. |
| 2018/0217951 A1* | 8/2018 | Benisty ............... G06F 13/1642 |

* cited by examiner

STORAGE SYSTEM AND METHOD FOR PROVIDING A DUAL-PRIORITY CREDIT SYSTEM

CROSS-REFERENCE TO RELATED APPLICATION

This application claims the benefit of U.S. provisional patent application No. 63/119,783, filed Dec. 1, 2020, which is hereby incorporated by reference.

BACKGROUND

A host can store data in and retrieve data from a memory in a storage system. The host may have a limited memory for storing messages received from the storage system. To control the flow of messages sent by the storage system to the host, the host can provide the storage system with a number of credits, where the storage system can send a message to the host only if the storage system has enough credits to send the message.

DETAILED DESCRIPTION

Overview

Figure 1A:
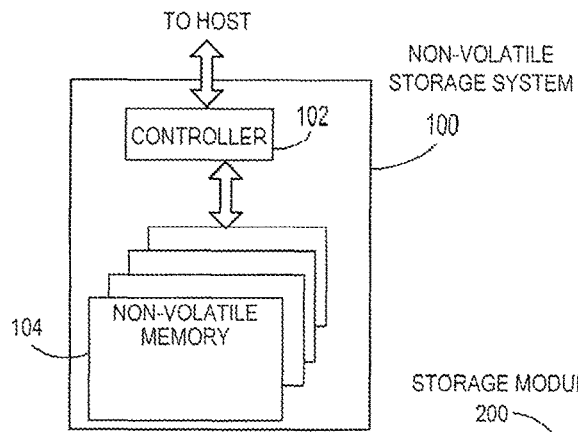
FIG. 1A is a block diagram of a non-volatile storage system of an embodiment.

By way of introduction, the below embodiments relate to a storage system and method for providing a dual-priority credit system. In one embodiment, a storage system is provided comprising a memory and a controller. The controller is configured to receive, from a host, a plurality of credits for sending messages to the host; allocate a first portion of the plurality of credits for non-urgent messages; and allocate a second portion of the plurality of credits for urgent messages.

In some embodiments, the controller is further configured to determine the first and second portions.

In some embodiments, the controller is further configured to determine the first and second portions using a configurable threshold.

In some embodiments, the controller is further configured to determine the first and second portions as a function of a total number of credits in the plurality of credits.

In some embodiments, the controller is further configured to change the first and second portions dynamically.

In some embodiments, the controller is further configured to change the first and second portions based on performance.

In some embodiments, the controller is further configured to change the first and second portions based on quality of service.

In some embodiments, the controller is further configured to: determine whether there are enough credits left in those allocated for urgent messages to send an urgent message to the host; and in response to determining that there are enough credits left, send the urgent message to the host.

In some embodiments, the controller is further configured to: in response to determining that there are not enough credits left, use credits allocated for non-urgent messages to send the urgent message to the host.

In some embodiments, the controller is further configured to: determine whether there are enough credits left in those allocated for non-urgent messages to send a non-urgent message to the host; and in response to determining that there are enough credits left, send the non-urgent message to the host.

In some embodiments, the controller is further configured to: in response to determining that there are not enough credits left, use credits allocated for urgent messages to send the non-urgent message to the host.

In some embodiments, the controller comprises a first first-in first-out buffer configured to store non-urgent messages and a second first-in first-out buffer configured to store urgent messages.

In some embodiments, the controller comprises a medium access control (MAC) and physical layer interface (PHY) module configured to allocate the first and second portions.

In some embodiments, the urgent messages comprise one or more of the following: a request to fetch a command structure from an administration queue, a request to adjust a latency tolerance reporting mechanism, a request to post a completion queue entry of an administration command, and a request to post a completion interrupt.

In some embodiments, the memory comprises a three-dimensional memory.

In another embodiment, a method is provided that is performed in a storage system comprising a memory. The method comprises receiving a plurality of credits from a host for transmitting messages to the host; and reserving a subset of the plurality of credits for transmitting an urgent message to the host.

In some embodiments, the method further comprises changing a number of the subset of the plurality of credits that are reserved.

In some embodiments, the number is changed based on performance.

In some embodiments, the number is changed based on quality of service.

In another embodiment, a storage system is provided comprising a memory; means for receiving a plurality of credits from a host for transmitting messages to the host; and means for allocating some of the plurality of credits in a pool used for transmitting an urgent message to the host.

Other embodiments are possible, and each of the embodiments can be used alone or together in combination. Accordingly, various embodiments will now be described with reference to the attached drawings.

Embodiments

Figure 1B:
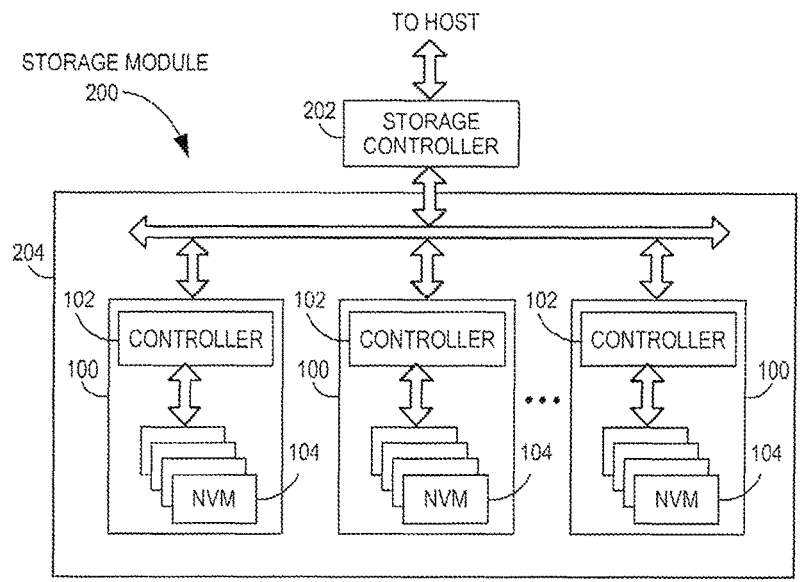
FIG. 1B is a block diagram illustrating a storage module of an embodiment.
Figure 1C:
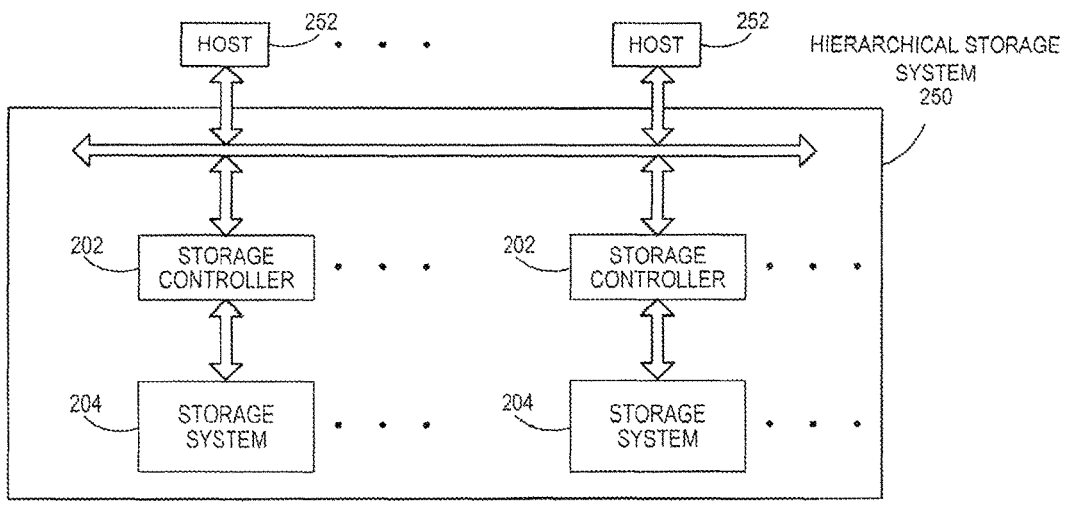
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
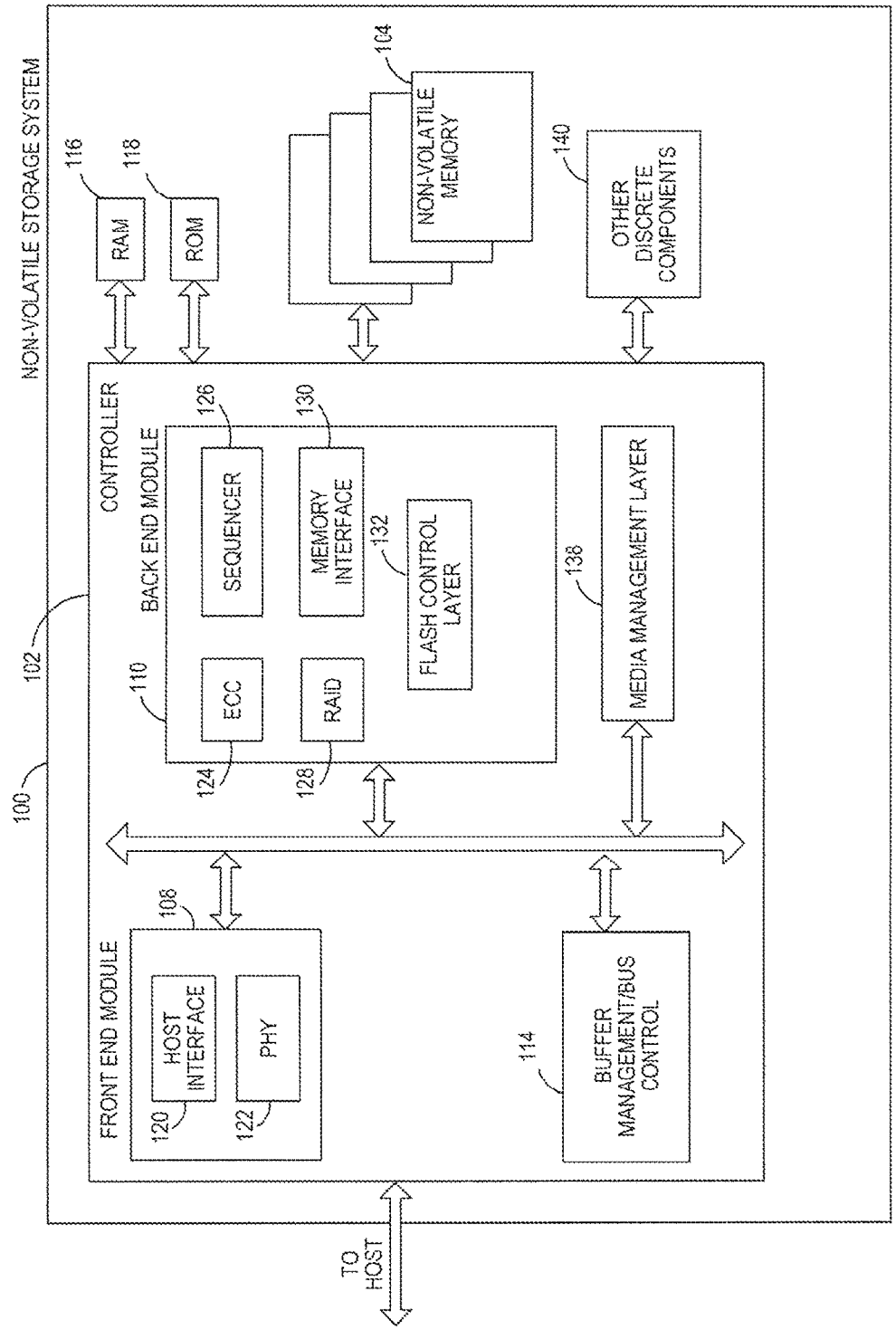
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
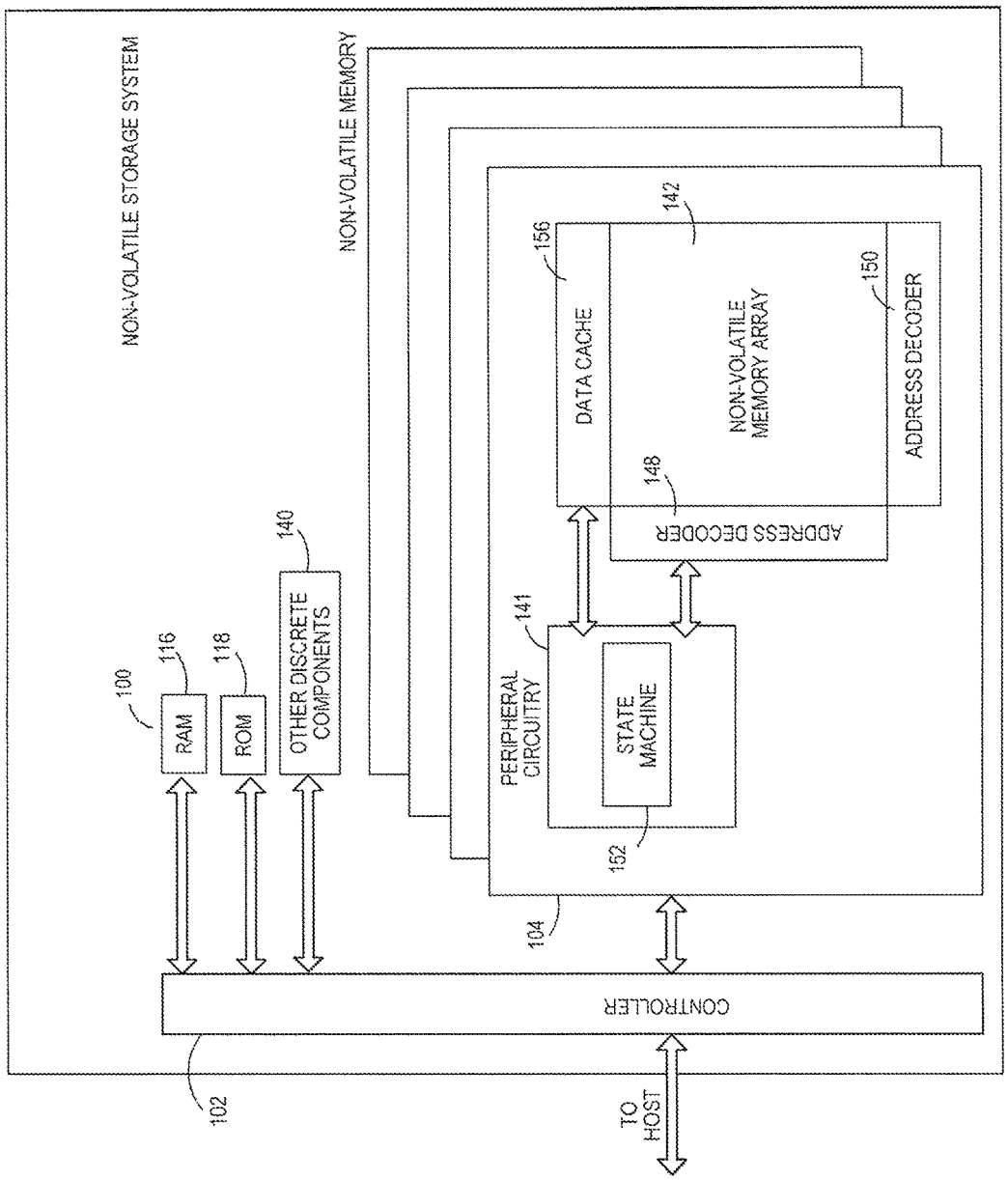
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
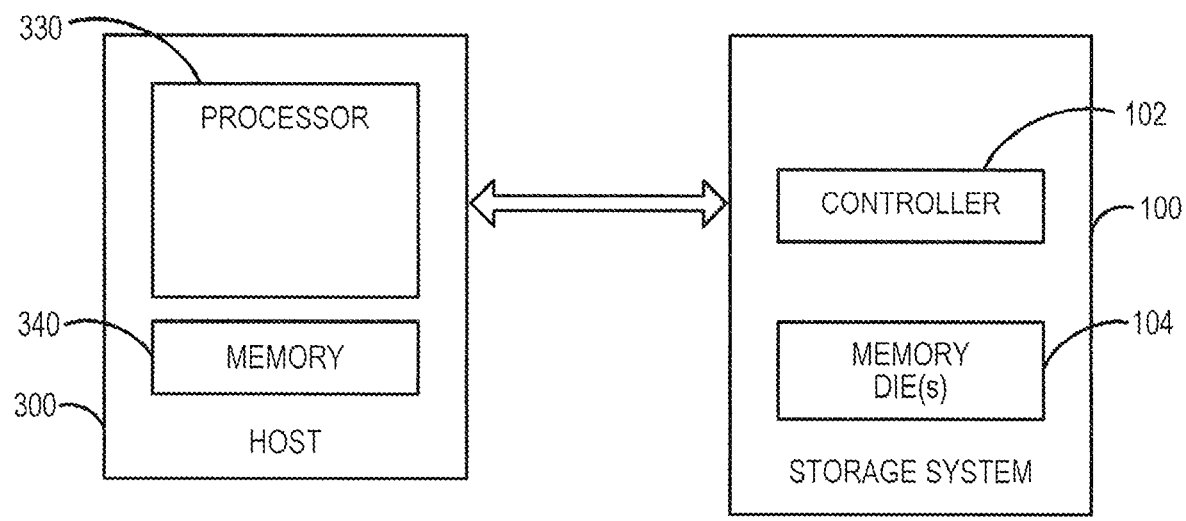
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Any protocol can be used to transmit data (e.g., user data or any type of message/request) between the storage system 100 and host 300. The following paragraphs discuss one example protocol. It should be understood that this is merely an example and other types of protocols can be used. So, the below claims should not be limited to any particular implementation or protocol unless explicitly recited therein.

In one example implementation, data link layer packets are used to communicate between the storage system and the host. A data link layer packet can be generated by wrapping transaction layer packets (TLPs) with a header (e.g., two bytes) and adding a cyclic redundancy check (CRC) at the end. Additionally a data link packet can run packets of its own for maintaining reliable transmission. These special packets are known as data link layer packets (DLLPs). Examples of DLLPs include: (1) an Ack DLLP for acknowledging successfully-received TLPs, (2) a Nack DLLP for indicating that a TLP arrived corrupted and that a retransmit is due (there is also a timeout mechanism in case nothing that looks like a TLP arrives), (3) flow control DLLPs (InitFC1, InitFC2 and UpdateFC) used to announce credits, and (4) power management DLLPs.

The flow control DLLPs are a flow control mechanism that makes sure that a TLP is transmitted only when the link partner has enough buffer space to accept it. This is relevant in the context of Message Signaled Interrupts (MSI), which use in-band messages to replace traditional out-of-band messages to signal an interrupt. For example, a flow control mechanism can run independent accounting for six distinct buffer consumers/credit types: (1) Posted Requests TLPs headers (relevant for MSI), (2) Posted Requests TLPs data (relevant for MSI), (3) Non-Posted Requests TLPs headers, (4) Non-Posted Requests TLPs data, (5) Completion TLPs headers, and (6) Completion TLPs data.

Credit accounting can be done in flow control units that correspond to four double words (DWs) of traffic (e.g., 16 bytes), rounded up to the nearest integer. Since headers can be three or four DWs in length, each TLP transmitted consumes one unit from the respective header credit. When data is transmitted, the number of consumed units is the number of data DWs in the TLP, divided by four, rounded upwards. In one embodiment, data buckets at the receiver are 16 bytes each, and mixing data from different TLPs is not allowed. Each bucket is a flow control unit.

In one embodiment, there is a doorkeeper at the transmitter that counts the total number of flow control units consumed since the link's establishment, separately for each credit type. This is six numbers to keep track of. This doorkeeper also has the information about the maximum number each of these credit types is allowed to reach. If a certain TLP for transmission would make any of these counted units exceed its limit, it is not allowed through, and another TLP may be transmitted instead (subject to reordering rules), or the doorkeeper can simply wait for the limit to rise.

This is the way the flow control generally works. When the link is established, both sides exchange their initial limits. As each receiver processes incoming packets, it updates the limits for its link partner, so it can use the buffer space released. UpdateFC DLLP packets are sent periodically to announce the new credit limits.

Since each link partner counts the total number of units since the link started, there is a potential for overflow. The PCIe standard allocates a certain number of bits for each credit type counter and its limit (e.g., eight bits for header credits and 12 bits for data credits), knowing that they will overflow pretty quickly. This overflow is worked around by making the comparison between each counter and its limit with straightforward modulo arithmetic. Given some restrictions on not setting the limit too high above the counter, the flow control mechanism implements the doorkeeper function described above.

Bus entities are allowed to announce an infinite credit limit for any or all of the six credit types, meaning that flow control for that specific credit type is disabled. As a matter of fact, endpoints (such as a storage system) must advertise an infinite credit for completion headers and data. In other words, an endpoint cannot refuse to accept a completion TLP based upon flow control. The requester of a non-posted transaction needs to take responsibility for being able to accept the completion by verifying that it has enough buffer space when making the request. This also applies to root complexes not allowing peer-to-peer transactions.

In one embodiment, the credit flow is as follows. At initialization, the host allocates credits to the storage system. During operation, from time to time, the host will update the storage system credits by allocating more credits to the storage system. Before posting any packet to the host, the storage system can be configured to: (1) classify packets (e.g., posted/non-posted requests), (2) make sure that the storage system has enough credits for posting the header and payload (i.e., Packet=Header+Payload), (3) consume the credits by decrementing the internal credit counter, (4) wait for additional credits if there are insufficient remaining credits, and (5) post the packet to the host.

There are three interrupt types in the PCI Express (PCIe) standard: (1) Legacy Interrupts, (2) MSI Interrupts, and (3) MSI-X Interrupts. Regarding Legacy Interrupts, in PCI Express, four physical interrupt signals (INTA-INTD) are defined as in-band messages. When the core needs to generate a legacy interrupt, it sends an INTA-INTD message upstream, which would ultimately be routed to the system interrupt controller. INTA messages are separate in-band messages for legacy interrupt assertion and de-assertion. The assert INTx message will result in the assertion of an INTx line virtually to the interrupt controller, and the Deassert INTx message will result in the de-assertion of the INTx line.

Figure 4:
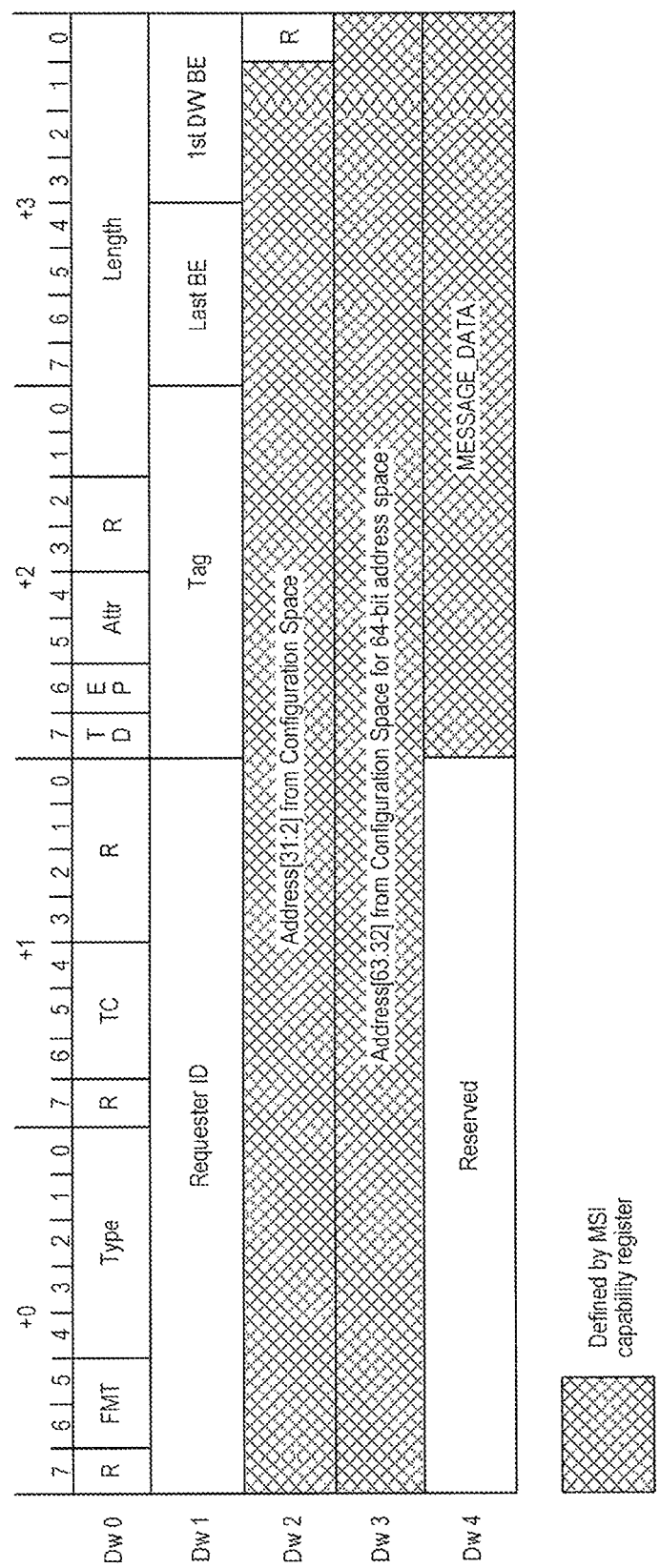
FIG. 4 is a diagram illustrating interrupt packet contents of an embodiment.

Regarding MSI Interrupts, MSI-capable devices implement the MSI capability structure defined in the PCI Local Bus Specification v3.0. PCI and PCI Express devices that enable MSI send interrupts to the CPU in-band. A MSI-enabled device will interrupt the CPU by writing to a specific address in memory with a payload of one double word (DW). FIG. 4 is a diagram illustrating interrupt packet contents of an embodiment. The memory write address combined with the data field allows a device to generate multiple unique interrupts. A memory write with an exclusive address and data field is commonly referred to as an MSI vector. The device (storage system) may support one, two, four, eight, 16, or 32 interrupt vectors.

MSI-X is an extension to MSI. It uses an independent capability structure. MSI-X (first defined in PCI 3.0) permits a device to allocate up to 2,048 interrupts. The single address used by original MSI was found to be restrictive for some architectures. In particular, it made it difficult to target individual interrupts to different processors, which is helpful in some high-speed networking applications. MSI-X allows a larger number of interrupts and gives each one a separate target address and data word. Devices with MSI-X do not necessarily support 2,048 interrupts, but it does support at least 64, which is double the maximum MSI interrupts. Optional features in MSI (e.g., 64-bit addressing and interrupt masking) are also mandatory with MSI-X.

As explained above, before transmitting any packet over the link, the transmitter must make sure that it has enough credits. Otherwise, the transmission of the packet is delayed. The following paragraphs describe an embodiment that addresses the problem where there is a need to transmit an urgent packet over the link, but transmission is delayed due to lack of credits. One example of this issue is the MSI-X interrupt. MSI-X interrupts are used by the storage system to send interrupts to the host in some failure cases. However, the credit method described above might paralyze the storage system and prevent it from sending an interrupt to the host when needed.

Figure 5:
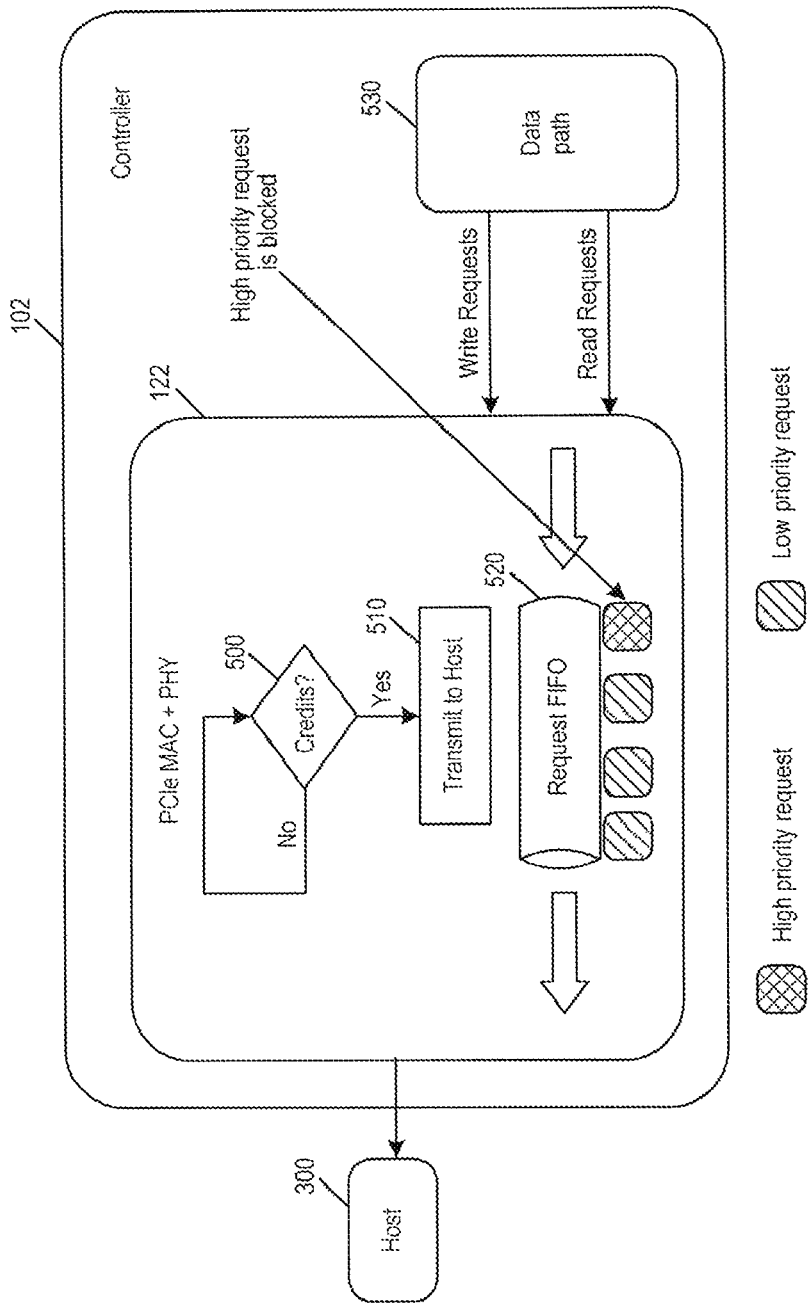
FIG. 5 is a block diagram of a controller of an embodiment

As mentioned above, some storage system use a credit system as a flow control mechanism to make sure data is transmitted only when the host has enough buffer space to accept it. FIG. 5 illustrates this flow control mechanism. In this particular example, the flow control mechanism is implemented in the medium access control (MAC) and physical layer interface (PHY) 122 module in the controller 102. It should be noted that this is just an example and that this functionality can be performed by other components of the controller 102 or the storage system 100. As shown in FIG. 5, controller 102 receives write and read requests from the data path 530 of the storage system 100, and these write and read requests are to be sent to the host 300. The MAC+PHY module 122 is configured to determine if there are enough credits available for the transmission (act 500). If there are enough credits available, that indicates that the host 300 has enough buffer space to receive the request. In that case, the request is sent to the host 300 (act 510). If there are not enough credits available, the controller 102 waits until the host 300 allocates enough credits to send the request.

In this example, the storage system 100 uses a request first-in first-out (FIFO) buffer 520 to store requests from the data path 520 before they are sent to the host 300. While one FIFO buffer 520 in shown in FIG. 5, two FIFO buffers can be used: one to hold write requests, and the other to hold the read requests. In operation, high-level read/write requests are sent to controller's internal logic 122, which sends the requests in order based on credit availability.

Because requests are sent in a first-in first-out (FIFO) basis, transmission of a high-priority request at the end of the request FIFO buffer 420 is delayed until the lower-priority requests are transmitted. This is shown in FIG. 5, where the high-priority request is not transmitted until lower-priority requests in front of it in the FIFO buffer 520 are transmitted. That is, the storage system 100 will only be able to send the high-priority request after posting all previous requests in the FIFO buffer 420 and having the credits back for sending the high-priority request. This can be sub-optimal. Blocking high-priority requests by low-priority requests can lead to quality of service (QoS) issues. Also, in exception scenarios, the host 300 may not update the credits for a very long time, in which case the storage system 100 is not able to send a short urgent packet (e.g., an MSI-X interrupt that needs to be sent in a failure situation), effectively leading to the storage system 100 appearing unresponsive to the host 300. This credit-starvation-induced paralysis can lead to communication failures, loss of connectivity between the host 300 and the storage system 100, and overall system failure (e.g., "blue screen of death," kernel panic, or similar symptoms).

Figure 6:
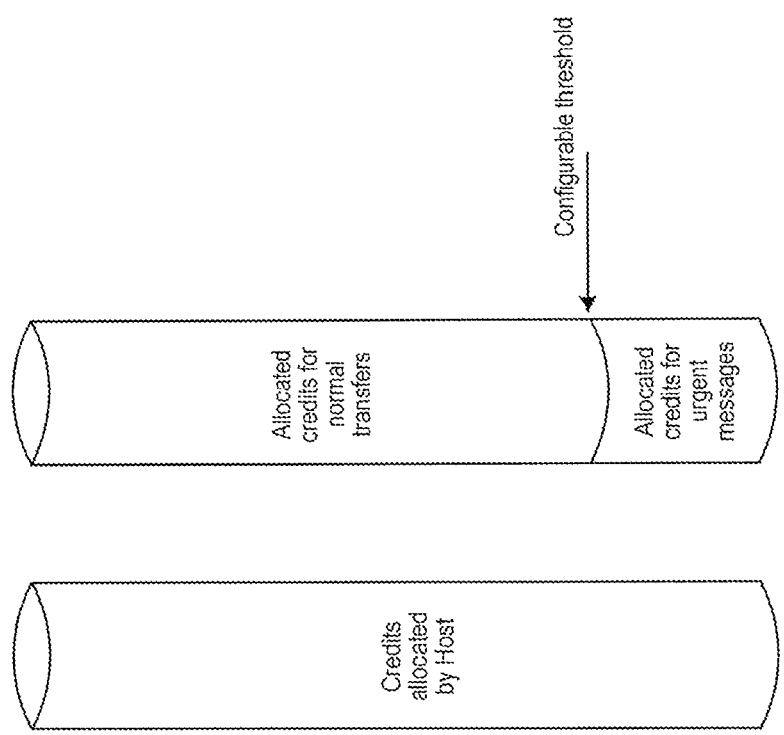
FIG. 6 is a diagram illustrating a dual-credit priority system of an embodiment.

The following embodiments can be used to addresses this problem of delaying the transmitting of urgent packets over a link to the host 300 due to lack of credits. In one embodiment, after the controller 102 receives a plurality of credits from the host 300, the controller 102 allocates a first portion of the plurality of credits for non-urgent messages and allocates a second portion of the plurality of credits for urgent messages. This is shown in the diagram in FIG. 6. By reserving credits for urgent messages, the storage system 100 can ensure that there are credits available to send an urgent message.

As used herein, an urgent message (sometimes referred to herein as a critical message) refers to a message that has a priority greater than another message, which is referred to herein as a non-urgent (or non-critical) message. Urgent messages can take any form, including, but not limited to a request to fetch a command structure from an administration queue, certain PCIe messages, a request to adjust a latency tolerance reporting (LTR) mechanism, a request to post a completion queue entry of an administration command (such as an asynchronous event request (AER)), and a request to post a completion interrupt. Of course, these are merely examples, and the message can take any other form. Also, as used herein, the term "message" broadly refers to any communication (e.g., a message, a request, a command, an instruction, a packet, an interrupt, etc.).

Figure 7:
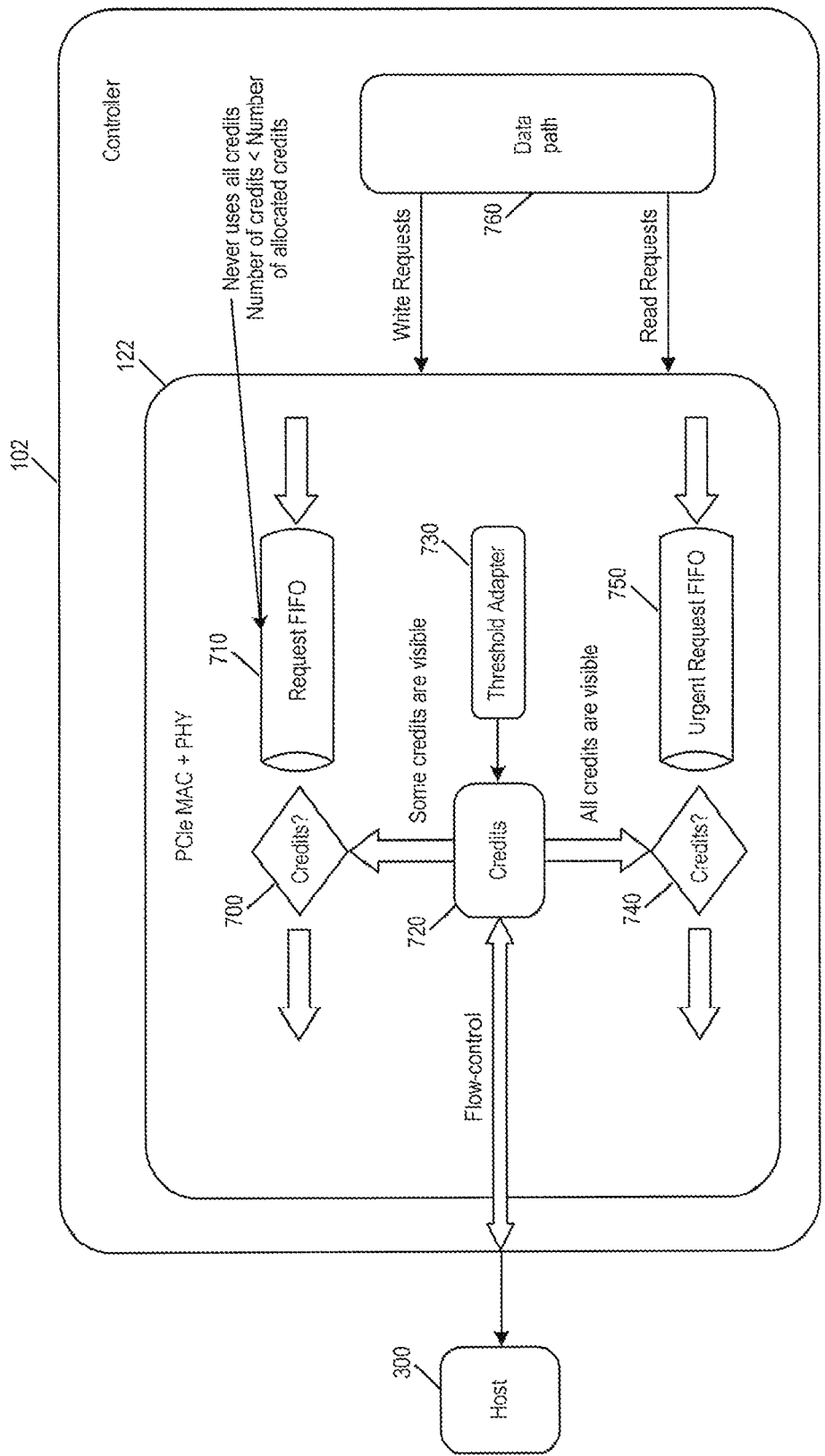
FIG. 7 is a block diagram of a controller of an embodiment

FIG. 7 is a block diagram of a controller 102 of an embodiment that can be used. In this embodiment, credits provided to the storage system 100 by the host 300 are used for flow control of messages sent to the host 300 from the storage system 100. As shown in FIG. 7, when the host 300 provides credits 720 to the storage system 100 (e.g., at an initialization phase), the controller 102 (e.g., using the MAC and PHY module 122) reserves a subset of the credits 720 for use in transmitting an urgent message to the host 300. This concept of allocating some credits to a pool for non-urgent messages and allocating other credits to a pool for urgent messages is referred to herein as a "dual-priority credit system." By using a dual-priority credit system, the storage system 100 can make sure that urgent messages will not be blocked by non-urgent message, as can be the case in the above example. That is, using the dual-credit method of this embodiment, the storage system 100 will likely always be able to send a critical packet without a delay. This can improve performance and quality of service, as exception flows for critical messages are likely never delayed.

In one embodiment, the controller 102 performs the allocation by determining how many credits to allocate to non-urgent and urgent message pools. This can be done by using a threshold and dividing the credits 720 received from the host 300. One part of the divided credits (in many situation, most of the credits) can be used for all normal transfer requests, and the other part can be used for urgent requests only (although, as noted below, in one embodiment, an urgent request can use any available credit in either pool). In one embodiment, the threshold is based on a function of a total number of credits 720 provided by the host 300.

As shown in FIG. 7, in one embodiment, the controller 102 has a threshold adapter 730 that is configured to change the number of credits allocated to the urgent and non-urgent message pools dynamically. For example, the threshold adapter 730 can change the allocation based on performance or quality of service (QoS). So, if the controller 102 detects that the storage system 100 is facing performance degradation due to lack of credits for the normal (non-urgent) requests, the threshold may be adapted to increase performance. Of course, those are merely examples, and other factors can be used.

As also shown in FIG. 7, in this embodiment, the controller 102 comprises a first first-in first-out (FIFO) buffer 710 configured to store non-urgent messages (requests) and a second FIFO buffer 720 configured to store urgent messages (requests). In operation, when there is a non-urgent request in the first FIFO buffer 710, the controller 102 determines whether there are enough allocated credits left to transmit the request (act 700). If there are, the controller 102 sends the request to the host 300. Similarly, when there is an urgent request in the second FIFO buffer 720, the controller 102 determines whether there are enough allocated credits left to transmit the request (act 740). If there are, the controller 102 sends the urgent request to the host 300.

In one embodiment, the pools of credits for the non-urgent and urgent messages are independent and are not shared. In other embodiments, one or both of the pools can be shared. For example, as indicated in FIG. 7, in one embodiment, all the credits 720 sent by the host 300 are visible when determining whether to send an urgent message, while only some of the credits (those allocated to the non-urgent-message pool) are visible when determining whether to send a non-urgent message. That way, credits reserved for urgent messages cannot be used for non-urgent messages, but credits reserved for non-urgent messages can be used for urgent messages, if needed. Because urgent messages are relatively rare, borrowing credits from the non-urgent-message pool should not result in a shortage of credits to send non-urgent messages. However, to avoid this possible "credit starvation" issue, the controller 102 can be configured with "starvation logic" to ensure that borrowing credits to send urgent message requests will not starve normal messages.

In an alternate embodiment, credits in the urgent-message pool can be used for sending non-urgent message, if needed or under certain conditions. In this alternative, the credits can be borrowed and paid back as soon as possible to help ensure there are credits available for urgent messages, should one need to be sent. As the use of this alternative runs the risk of credit starvation of urgent messages, the controller 102 can be configured with logic to safeguard against this danger.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        receive, from a host, a plurality of credits for sending urgent messages and non-urgent messages from the storage system to the host;
        initially allocate a first portion of the plurality of credits for sending non-urgent messages and a second portion of the plurality of credits for sending urgent messages;
        dynamically increase a number of credits in the first portion in response to performance degradation of the storage system due to lack of credits for sending non-urgent messages, wherein the number of credits is dynamically increased by reallocating credits from the second portion to the first portion;
        use a credit from the first portion to send an urgent message even though the credit from the first portion was allocated for sending non-urgent messages; and
        return the credit to the first portion before a credit starvation issue occurs in which there is a shortage of credits available for sending a non-urgent message.

2. The storage system of claim 1, wherein the controller is further configured to determine the number of credits in the first portion and the second portion.

3. The storage system of claim 1, wherein the controller is further configured to determine the number of credits in the first portion and the second portion as a function of a total number of credits in the plurality of credits.

4. The storage system of claim 1, wherein the controller is further configured to change the number of credits in the first portion and the second portion based on quality of service.

5. The storage system of claim 1, wherein the controller is further configured to:
    determine whether there are enough credits available for sending an urgent message to the host; and
    in response to determining that there are enough credits available for sending the urgent message to the host, send the urgent message to the host.

6. The storage system of claim 5, wherein the controller is further configured to re-adjust a configurable threshold to make the at least one of the credits available for sending the urgent message in response to determining that there are not enough credits available for sending the urgent message to the host.

7. The storage system of claim 1, wherein the controller is further configured to:
    determine whether there are enough credits available for sending a non-urgent message to the host; and
    in response to determining that there are enough credits available for sending the non-urgent message, send the non-urgent message to the host.

8. The storage system of claim 1, wherein the controller comprises:
    a first first-in first-out (FIFO) buffer configured to store non-urgent messages; and
    a second FIFO buffer configured to store urgent messages.

9. The storage system of claim 1, wherein the controller comprises a medium access control (MAC) and physical layer interface (PHY) module configured to allocate the first portion and the second portion.

10. The storage system of claim 1, wherein the urgent messages comprise a request to post a completion queue entry of an administration command.

11. The storage system of claim 1, wherein the memory comprises a three-dimensional memory.

12. The storage system of claim 1, wherein the urgent messages comprise a request to fetch a command structure from an administration queue.

13. The storage system of claim 1, wherein the urgent messages comprise a request to adjust a latency tolerance reporting mechanism.

14. The storage system of claim 1, wherein the urgent messages comprise a request to post a completion interrupt.

15. A method comprising:
    performing the following in a storage system comprising a memory:
        receiving, from a host, a plurality of credits for sending urgent messages and non-urgent messages from the storage system to the host;
        initially allocating a first portion of the plurality of credits for sending non-urgent messages and a second portion of the plurality of credits for sending urgent messages;
        dynamically increasing a number of credits in the first portion in response to performance degradation of the storage system due to lack of credits for sending non-urgent messages, wherein the number of credits is dynamically increased by reallocating credits from the second portion to the first portion;
        using a credit from the first portion to send an urgent message even though the credit from the first portion was allocated for sending non-urgent messages; and
        returning the credit to the first portion before a credit starvation issue occurs in which there is a shortage of credits available for sending a non-urgent message.

16. The method of claim 15, further comprising determining the number of credits in the first and second portions.

17. A storage system comprising:
    a memory;
    means for receiving, from a host, a plurality of credits for sending urgent messages and non-urgent messages from the storage system to the host;
    means for initially allocating a first portion of the plurality of credits for sending non-urgent messages and a second portion of the plurality of credits for sending urgent messages;
    means for dynamically increasing a number of credits in the first portion in response to performance degradation of the storage system due to lack of credits for sending non-urgent messages, wherein the number of credits is dynamically increased by reallocating credits from the second portion to the first portion;
means for using a credit from the first portion to send an urgent message even though the credit from the first portion was allocated for sending non-urgent messages; and
means for returning the credit to the first portion before a credit starvation issue occurs in which there is a shortage of credits available for sending a non-urgent message.

\* \* \* \* \*